March 28, 1950

H. T. BOOTH

2,501,709

AUTOMATIC CUT-OFF FOR DAMAGED RADIATOR SECTIONS

Filed May 8, 1946

INVENTOR
HARRY T. BOOTH.
BY
ATTORNEY

March 28, 1950     H. T. BOOTH     2,501,709
AUTOMATIC CUT-OFF FOR DAMAGED RADIATOR SECTIONS
Filed May 8, 1946     6 Sheets-Sheet 2

INVENTOR
HARRY T. BOOTH.
BY
ATTORNEY

March 28, 1950  H. T. BOOTH  2,501,709
AUTOMATIC CUT-OFF FOR DAMAGED RADIATOR SECTIONS
Filed May 8, 1946  6 Sheets-Sheet 3

INVENTOR
HARRY T. BOOTH.
BY
ATTORNEY

Patented Mar. 28, 1950

2,501,709

UNITED STATES PATENT OFFICE 2,501,709

AUTOMATIC CUTOFF FOR DAMAGED RADIATOR SECTIONS

Harry T. Booth, Dayton, Ohio, assignor to United Aircraft Products, Inc., Dayton, Ohio, a corporation of Ohio Application May 8, 1946, Serial No. 668,265

10 Claims. (Cl. 257—2)

This invention relates to liquid cooling systems, and particularly to apparatus for protecting such systems against excessive loss of fluid through leakage, as may result, for example, from radiator damage.

The invention has special although not limited application to the radiators of aircraft engine coolant flowing systems. In such systems, the coolant is circulated under relatively high pressure and the radiator conventionally provides a number of parallel flow paths in which the coolant passes in heat exchange relation to the air. Should a leak develop in one or more of said paths, as from a defective or damaged tube, the loss of coolant, which the pilot has heretofore been powerless to prevent, quickly results in engine failure. In high powered combat aircraft, the engine failure follows by a matter of seconds radiator damage by shell or gun fire, so that in single engine aircraft it has been the invariable practice promptly to abandon the plane when rising engine temperature or specific warning device gave notice of a damaged radiator.

It is proposed, according to the present invention, to control flow through the several parallel circuits defined by the radiator in such wise that any circuit subject to leakage may be isolated and flow therethrough discontinued without, however, disturbing or interrupting flow through the remaining circuits.

To accomplish such control, and thereby to permit continued effective operation of a liquid cooling system under conditions heretofore destructive of such system, is, therefore, the principal object of the invention.

Another object of the invention is to interrupt flow through a radiator circuit automatically in response to flow variation therethrough indicating leakage from the said circuit.

Still another object is to incorporate in a radiator made up of a plurality of parallel flow sections, means for sealing off automatically the inlet and outlet ends of any section in which leakage occurs.

A further object is to measure the rate of flow from the outlet of a radiator section and to cut off flow through said section when the flow rate decreases below a predetermined value.

A still further object of the invention is to prevent interruption of flow through any one or all of the radiator sections when the measured flow rate decreases for a reason other than leakage, for example, as a result of reduced engine speed.

In accordance with the above objects, the inlet and outlet of each radiator section are provided with valves normally biased toward closed position, the inlet valve being latched in open position and the outlet valve being arranged in the path of flow in such wise as to be held open by such flow, a closing motion of the outlet valve in response to decreased flow being utilized to unlatch the inlet valve whereupon both valves are permitted to close to isolate the affected section from the system. The means for preventing flow interruption when the flow rate decreases for a reason other than radiator leakage resides in an overriding control responsive to the rate of flow of the fluid entering the radiator to render the motion of the outlet valves ineffective to unlatch their respective inlet valves when the inlet flow rate drops below a predetermined value.

Other objects and structural details of the invention will appear from the following description when read in connection with the accompanying drawings, wherein:

Fig. 3 is a view of the radiator in front elevation;

Figures 1, 2:
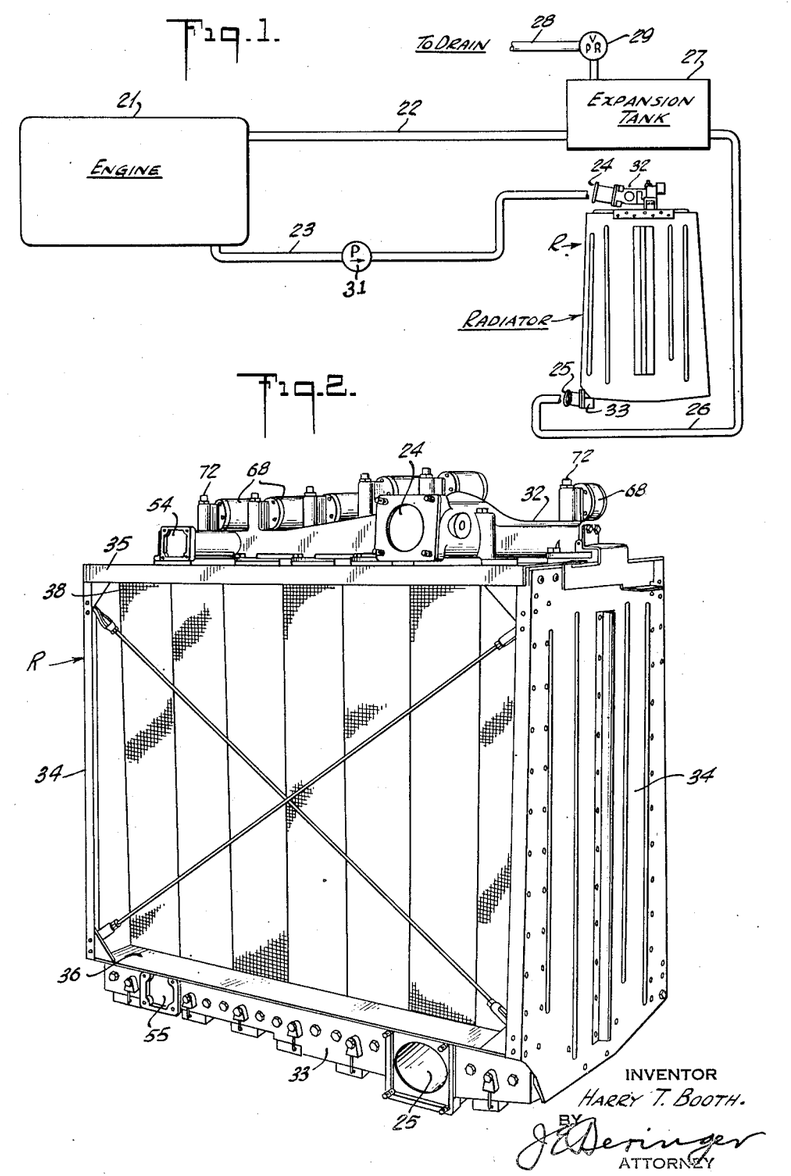
Fig. 1 is a diagram of an engine cooling system, showing a radiator constructed in accordance with the teachings of the present invention.
Fig. 2 is a view of the radiator of Fig. 1 in perspective.

Referring to Fig. 1, a liquid cooled aircraft engine is indicated diagrammatically at 21. The cooling system includes coolant conducting pipe or hose lines 22 and 23 respectively acting to conduct the coolant, such as water, to and from the engine. The coolant leaving the engine is directed by way of conduit 23 to the inlet 24 of a radiator R, conventionally disposed in the path of flow of air in order that the air and coolant may pass in heat exchange relation and some of the heat imparted to the coolant by its passage through the engine thereby be removed. Flowing from an outlet 25 of the radiator R the coolant, which will hereinafter be referred to as water, is conveyed by a conduit 26 to an expansion tank 27 from whence it is returned by conduit 22 to the engine. The expansion tank 27 has a line 28 extending therefrom to a point of drainage, flow through the line 28 being controlled by a pressure responsive valve 29. Thus a substantially constant volume of water is permitted to circulate through the system at all times, provision being made through the tank 27 and pressure responsive valve 29 to compensate for the effect of changing temperature on the liquid. Enforced circulation of the water under pressure is obtained through the provision of pump means 31, usually engine driven, one or more of which may be selectively disposed in the system. According to the operation of the system, water is withdrawn from the expansion tank 27 and flows by way of conduit 22 to the engine where it is forced through the cooling passageways surrounding the cylinders and then leaves the engine by way of conduit 23, being directed thereby to radiator R. Flowing through the radiator R the water is reduced in temperature and returned through conduit 26 to expansion tank 27 in condition again to act as a coolant for the engine. During normal operation, the water flows under relatively high pressure and at a velocity bearing a determined relation to engine speed.

Figure 4:
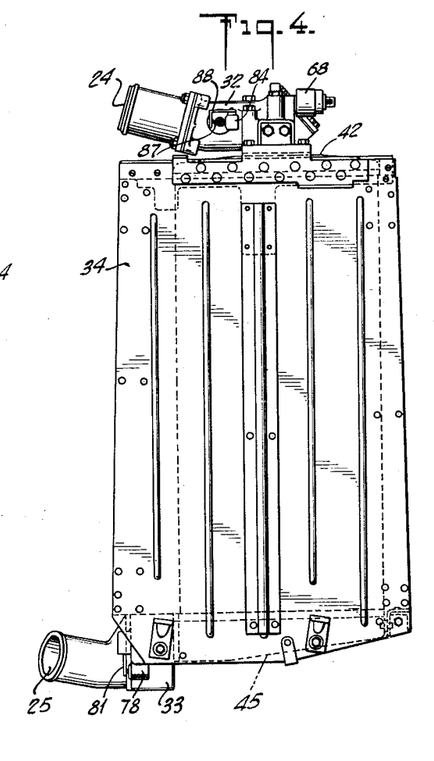
Fig. 4 is a view of the radiator in right hand side elevation.

Considering the radiator R in greater detail and referring to Figs. 2-4, the inlet 24 and outlet 25 thereof respectively are parts of an upper manifold 32 and a lower manifold 33. The manifolds 32 and 33 occupy top and bottom positions externally of the heat exchange portion of the radiator, being bolted to end plates 34 which, together with upper and lower side rails 35 and 36, constitute the radiator frame. The frame forms a generally rectangular opening within which is the core of the radiator comprising a number (in the present case 7) of identical sections. Each section is made up of approximately 150 tubes 37 which, as may be seen in Fig. 5, have a flat oval shape for maximum contact with the water which flows therethrough, the tubes being spaced apart for the passage of air therearound. The tubes 37 are passed through spaced fins 38 which are in contact with the tubes and increase the heat dissipation characteristics thereof. According to the construction and arrangement of parts, the several radiator sections represent parallel flow paths whereby the water may travel from manifold 32 to manifold 33.

Figure 5:
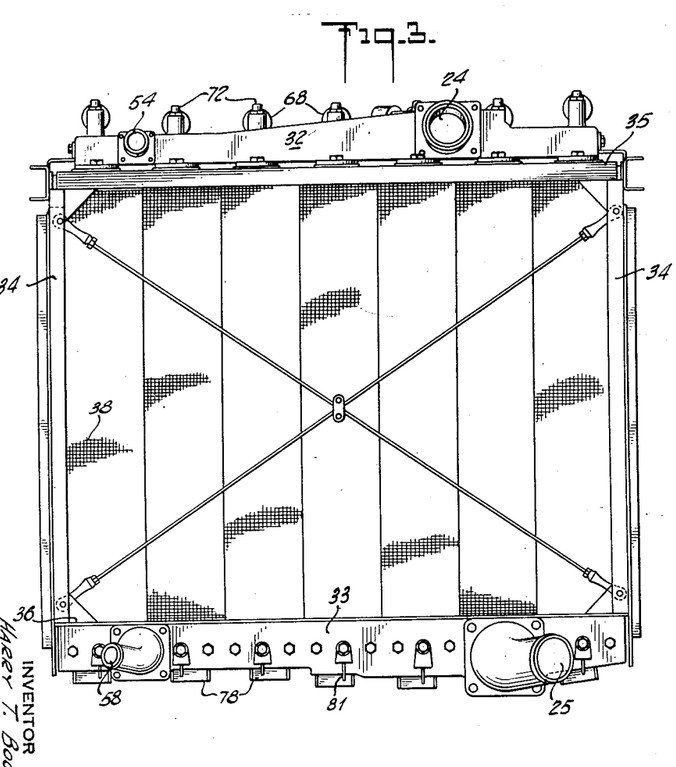
Fig. 5 is a view of a single section of the radiator in plan and with the upper manifold removed, part of the header tank being broken away to show the shape and arrangement of the heat exchange tubes.
Figures 5, 6, 7:
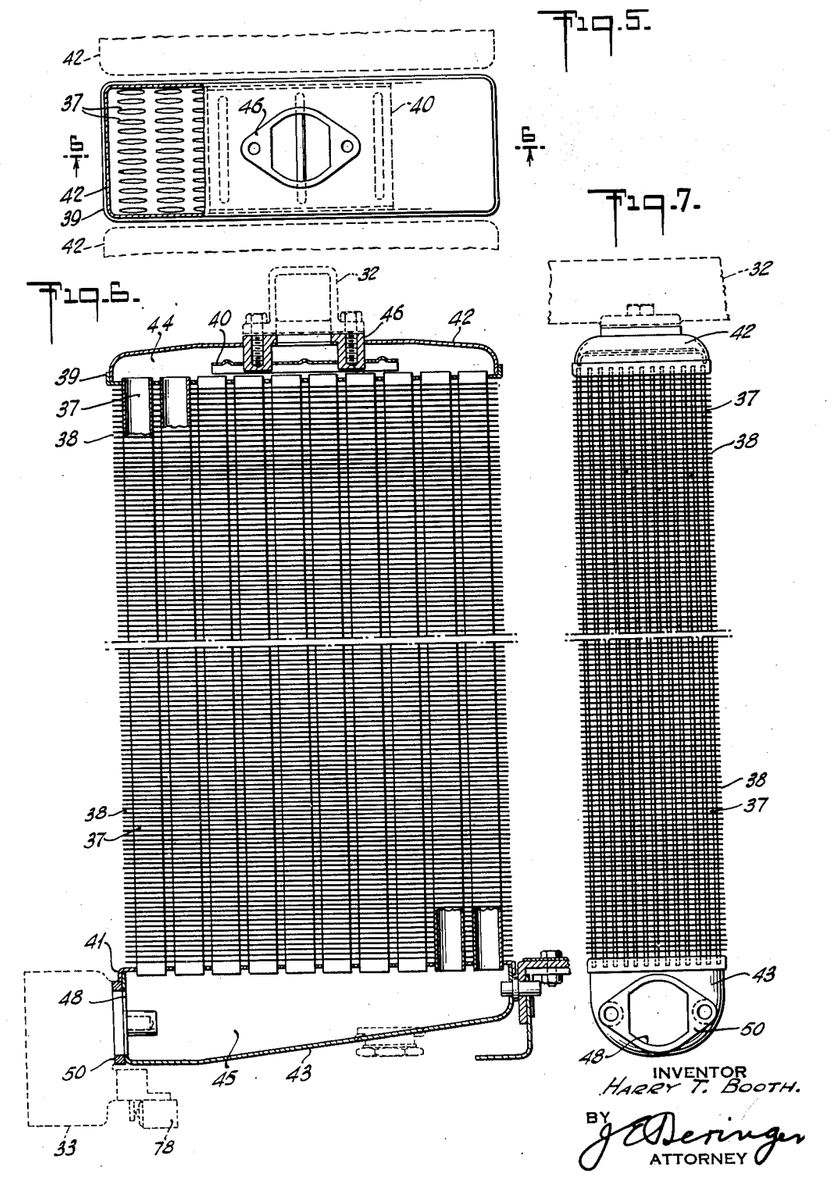
Fig. 6 is a view in cross section taken substantially along the lines 6—6 of Fig. 5.
Fig. 7 is a view of the radiator section of Figs. 5 and 6 in side elevation.

All the radiator sections are the same in substance so that a description of one will suffice for all. Referring to Figs. 5-7, the tubes 37 are arranged in rows and have their opposite ends extending through openings in upper and lower header plates 39 and 41. The ends of the header plates 39 and 41 are turned outward in order that they may abut the corresponding plates of adjacent sections and in order to receive in a fluid tight manner complementary turned over ends of closure members 42 and 43. Together, upper header plate 39 and closure 42 define a tank or header chamber 44 communicating with the upper ends of tubes 37. Lower header plate 41 and closure 43 define a tank or header chamber 45, communicating with the lower ends of tubes 37. Closure member 42 is formed with a central opening receiving a bushing 46. The manifold 32 has a flange complementary to bushing 46 and further has an opening 47 registering with the inner diameter of the bushing. Within the chamber 44, the bushing 46 supports a baffle 40 whereby the incoming water may be spread throughout the section. Closure member 43 has a downwardly sloping conformation toward the left as viewed in Fig. 6 and at its left hand end is formed with an opening 48 opposite and communicating with an opening 49 in the lower manifold 33, a spacer element 50 serving as a connection means between the manifold and header tank.

Figure 9:
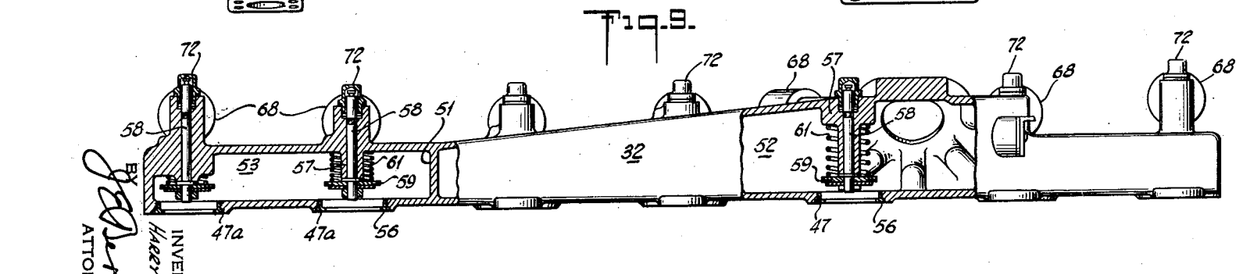
Fig. 9 is a view of the inlet manifold in side elevation, parts thereof being broken away to show the position of the inlet control valves.

As shown in Fig. 9, upper manifold 32 is hollow throughout its length except for a partition wall 51 designed to separate two sections of the radiator from the others in order that these might be used for intercooling. The space within the manifold 32 to the right of partition 51 is identified as chamber 52 while the space to the left of partition 51 is identified as chamber 53. Chamber 53 is provided with a separate inlet 54 and communicates through openings 47ª with the two left hand sections of the radiator as viewed in Fig. 2. The lower manifold 33 is provided, in addition to its main outlet 25, with an outlet 55 for the intercooler sections, the manifold 33 being provided with a partition wall (not shown) the same as manifold 32, dividing the interior thereof into main and auxiliary chambers.

It will be understood, however, that insofar as the instant invention is concerned, it is immaterial how the several sections of the radiator may be divided and used, it being simply the present object to seal off and close any radiator section which through damage or other cause leaks to an extent of a predetermined poundage per minute.

Figure 13:
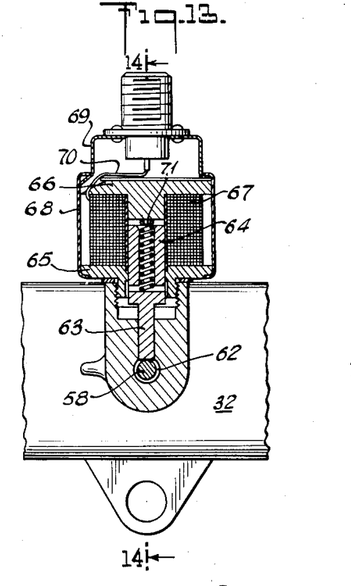
Fig. 13 is a fragmentary view of the inlet manifold taken at one of the several vertical valve positions, the electrically actuated valve release being shown in longitudinal section.
Figure 14:
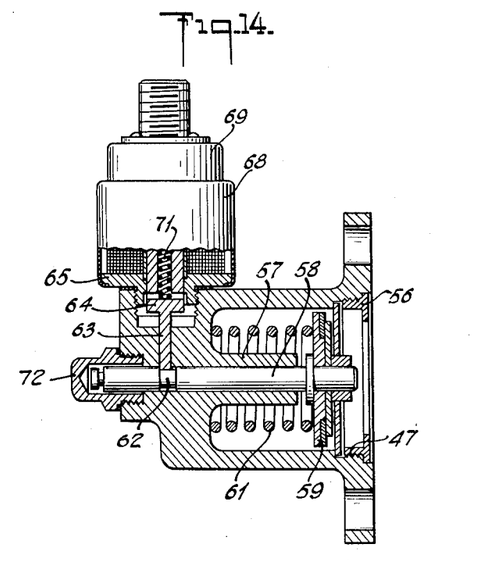
Fig. 14 is a view in cross section taken substantially along the line 14—14 of Fig. 13.
Figure 15:
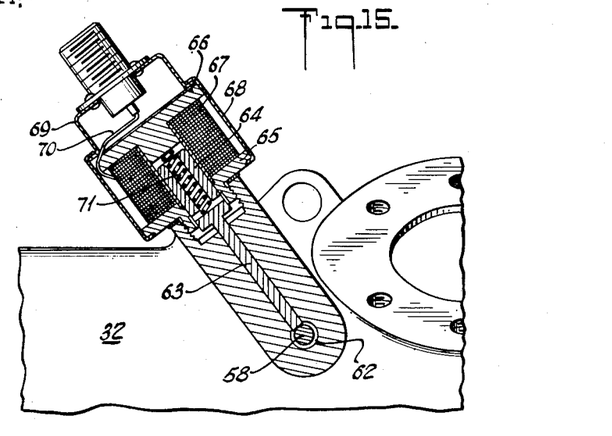
Fig. 15 is a view of another valve position, showing the electrically actuated solenoid valve release in longitudinal section.

Considering now the means by which such automatic closing of the radiator sections is accomplished, it will be observed in Fig. 9 that each of the openings 47 in the manifold 32 has pressed therein a bushing 56 providing a valve seat. Disposed opposite each valve seat 56 is an internal boss 57 in which a rod 58 is slidably mounted. Attached to the projecting end of rod 58 is a valve 59 adapted to seat in bushing 56 and close off the flow of fluid therethrough. A spring 61 surrounds boss 57 and acts on valve 59 in a direction to urge it to closed position. As shown in Figs. 13 to 15, valve 59 is held normally in open position by latching means. Thus, near the upper end thereof, the rod 58 is circumferentially grooved as indicated at 62 to receive a latch 63. The latch 63 extends through the manifold 32 at right angles to the rod 58 and is formed as an integral extension of the plunger 64 of an electric solenoid unit. This unit comprises a spool made of end plates 65 and 66 upon which is wound an electrical coil 67 surrounding and defining a slideway for the plunger 64. The solenoid spool and coil 67 is enclosed by a tubular casing 68 to which is attached an end housing 69 through which an electrical lead 70 is introduced into the unit. The solenoid unit is fixed to the manifold 32, a screw threaded projection on plate 64 being received in a threaded opening in the manifold. Piston plunger 64 is pressed outward by means of a spring 71 in such wise as to cause the latch 63 to engage in the circumferential groove 62 in rod 58 and thereby to hold the rod and valve 59 against the urging of spring 61. However, should the solenoid coil 67 become energized, the plunger 64 is drawn rearwardly in its slideway to pull the latch 63 out of cooperative relation with the rod 58 whereupon spring 61 is permitted to press valve 59 to closed position within its bushing 56. The valve 59 is reset to open position manually. It will be noted that the upper end of rod 58 extends outside manifold 32 and is contained within a removable closed nut 72. In resetting the valve, after the solenoid coil 67 has been deenergized, nut 72 is removed and rod 58 is lifted by hand until latch 63 engages in the circumferential groove 62.

A valve 59 and associated parts, including a solenoid disabled latch for the valve, is provided for each opening 47 and 47ª in the manifold 32 so that individual control of flow through the several sections of the radiator is had. By reason of the varying formation of the manifold 32, the angular position and the size of some of the parts of the valve and solenoid assembly may not be the same in all instances. They are, however, substantially the same in construction and are identical in their function and mode of operation.

Figure 10:
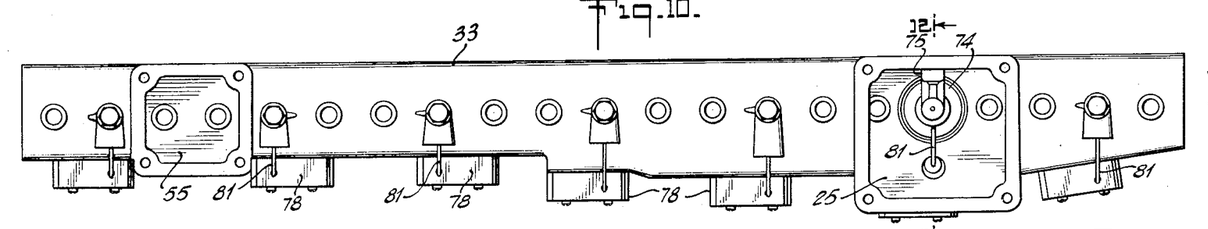
Fig. 10 is a view of the radiator outlet manifold in front elevation.
Figure 11:
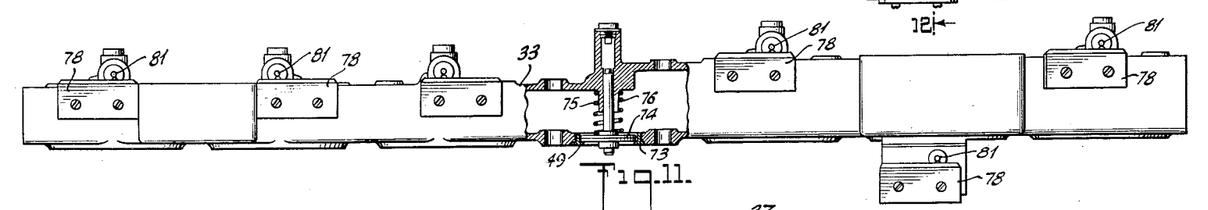
Fig. 11 is a view of the outlet manifold in side elevation, being partly broken away to show the construction and arrangement of one of the outlet control valves.
Figure 12:
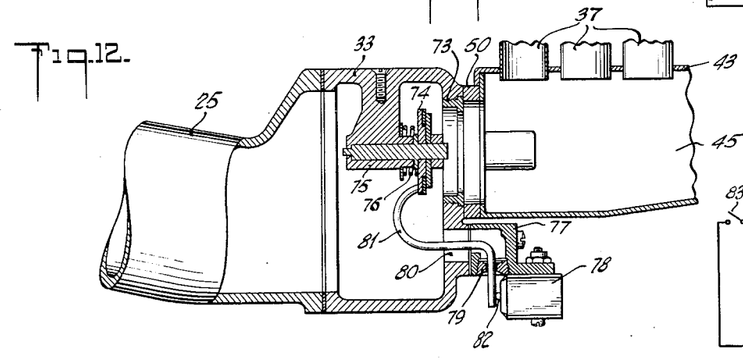
Fig. 12 is a fragmentary view in cross section taken substantially along the line 12—12 of Fig. 10.

Referring to Figs. 10, 11 and 12, which show the lower manifold 33 in detail, it will be seen that in each of the openings 49 is a bushing 73 furnishing a seat for a valve 74 within the manifold 33. The stem of valve 74 is slidable within an internal boss 75, while a spring 76 surrounding boss 75 presses the valve toward closed position within bushing 73. Valve 74, under the urging of spring 76, occupies normally a closed position preventing flow through opening 49. In response to the pressure of the liquid entering header chamber 45, however, valve 74 moves to open position permitting the water to pass from the header chamber of the manifold 33 and back to expansion tank 27.

The motion of valve 74 is utilized to control opening and closing motion of the upper valve 59. Beneath each of the closure members 43 defining header chambers 45 there is fastened to the manifold 33 a bracket 77 carrying an electrical switch 78. On its underside the bracket 77 has pressed therein a gland 79 for service as a bearing and support for a curved lever 81 which extends through an opening 80 in the manifold 33 and curves into contact with the upper surface of valve 74. The outer end of lever 81 overlies and contacts a plunger 82 in the switch 78. The arrangement is such that when valve 74 is moved off its seat by the pressure of water flowing from header chamber 45 into manifold 33 toward the radiator outlet, lever 81 is rocked about the pivot defined by gland 79 into a position depressing plunger 82. Should valve 74 be permitted to return towards its seat in bushing 73, lever 81 follows, rocking out of switch operating position, it being understood that lever 81 is urged toward contact with valve 74 by switch plunger 82 which is a member spring biased outward of the switch case. Switch 78 is in its illustrated embodiment a well known instrument commercially known as a microswitch. These elements may be either normally closed or normally opened and respond to pressure on the plunger 82 to move with a snap action to their other position of adjustment. According to the present combination and arrangement of parts, the switch 78 is normally closed. Thus, when the lever 81 rocks in response to opening motion of the valve 74, depression of plunger 82 results in opening switch 78 and closing motion of the valve permits the switch to close.

Figure 8:
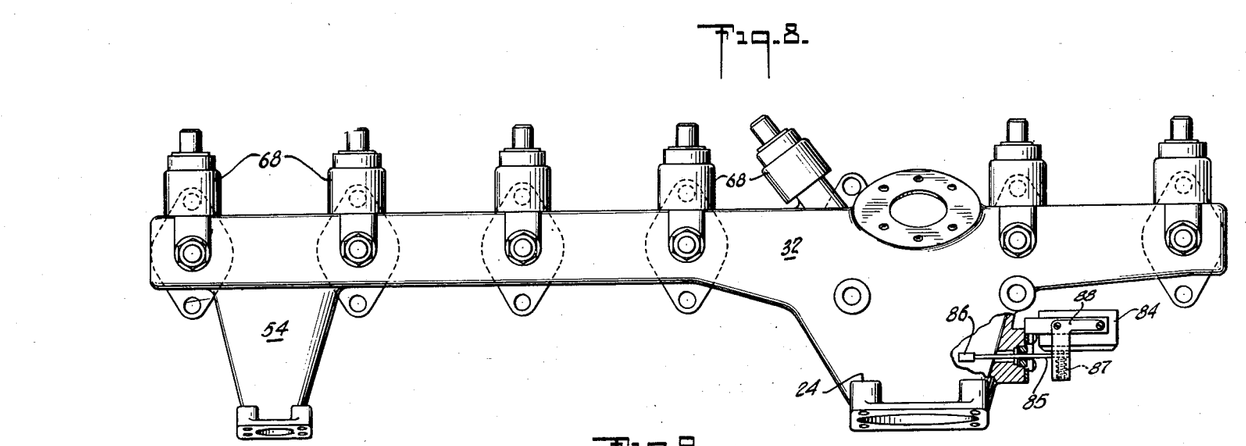
Fig. 8 is a detailed view in plan of the inlet radiator manifold.
Figure 16:
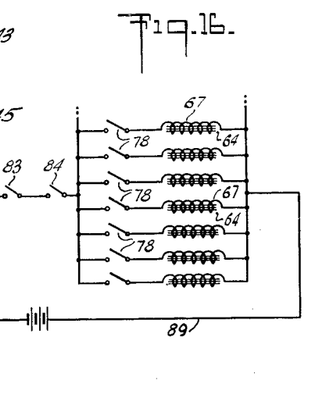
Fig. 16 is a diagram of the electrical circuit whereby operation of the solenoid release members is effected.

As shown in Fig. 16, switch 78 is in series in an electrical circuit 89 with the solenoid coil 67 so that when switch 78 closes, solenoid 67 is energized and latch 63 withdrawn to permit closing of upper valve 59. It further will be noted in Fig. 16, however, that there also is incorporated in the electrical circuit a manually operated switch 83 and an automatic flow responsive switch 84. Switch 83 is conveniently located for operation by the pilot or flight engineer and may be closed after the engine is started. Switch 84, as seen in Fig. 8, is located at the inlet to upper manifold 32 and its function is to prevent the closing off of one or more of the radiator sections when flow through such sections is reduced to a low value not as a result of damage but for other reasons, for example, throttling of the engine to a very low speed. For the control of switch 84, there is provided a rod 85 which extends laterally into the inlet 24 of manifold 32 and has on its inner end an enlarged or paddle portion 86. The mounting of rod 85 is such as to permit pivotal rocking motion thereof and it is urged in a direction to hold the actuating plunger of switch 84 depressed by means of a spring 87 held by a bracket 88 supporting the switch 84. Switch 84 also is of the micro-type and is arranged to be normally closed. Accordingly, when the actuating plunger is held depressed by spring 87 acting through rod 85, the switch is opened and release of any of the solenoid controlled valves 59 is prevented. The enlarged or paddle portion 86 of the rod 85 is disposed in the path of the incoming fluid at inlet 24, which fluid exerts a pressure on the rod in a direction contrary to that of spring 87 and ordinarily of sufficient magnitude to hold the spring ineffective whereby switch 84 is closed. Should the flow of fluid through inlet 24 decrease to a low value as a result of a very low engine speed, the fluid pressure or flow velocity will be insufficient to overcome spring 87 so that rod 85 will be rocked thereby to open switch 84. In this manner the valves 74 are rendered ineffective to control opening and closing movements of valves 59. A showing of the electrical leads in circuit 89 and their connection to battery has been omitted from the structural views.

Considering a sequence of operations, therefore, it may be assumed that the engine is started, with, however, the manually operated switch 83 still open. Under the impulse imparted by pump 31, the water flows into upper manifold 32 and acts on rod 85 to permit switch 84 to close. Within manifold 32, the water finds valves 59 open and accordingly flows through the several openings 47 into the header chambers 45 of the radiator sections. In each section, after flowing from the upper header chamber 44 through tubes 37 to the lower header chamber 45, the water acts on valve 74 moving this valve off its seat against the urging of spring 75 and acting at the same time to rock curved lever 81 to depress plunger 82 of switch 78 whereby to open the circuit leading through the associated solenoid coil 66. The closing of switch 84 and the opening of switch 78 are concomitant operations, occurring immediately after starting of the engine. Accordingly, at any time thereafter the switch 83 may be closed to condition the electrical circuit for automatic damage responsive operation. Flow will continue in this manner around the open valves 59 and 74 so long as the pressure and flow velocity of the water remain at normal operating values. If, however, it be assumed that one or more of the tubes 37 becomes cracked or broken, the water flowing through that tube or tubes will escape at the point of damage. Therefore, the velocity of the water entering lower header chamber 45 of the damaged section and passing to manifold 33 by way of opening 48 will decrease and valve 74 will move towards its seat in bushing 73. Such motion is followed by the lever 81 which moves away from switch actuating plunger 82 allowing switch 78 to close the circuit through solenoid coil 67. The solenoid unit when energized unlatches the stem 58 of valve 59, allowing this valve also to move to closed position. The damaged section thereby is closed at both the inlet and outlet ends, the valves 59 and 74 being maintained in closed position by their respective springs 61 and 75 and by the pressure of the water in the manifolds 32 and 33.

Flow through the remaining radiator sections is not disturbed, and the cooling system continues to function as a closed circuit effectively cooling the engine, although the temperature thereof may rise slightly due to the cutting out of a radiator section.

Correlating this sequence of operations with the electrical circuit of Fig. 16, it will be observed that the several switches 78 are arranged in parallel relation, each with its associated solenoid coil 67. Under static or "no-flow" conditions, switches 83 and 84 stand open while all the switches 78 are closed. When the engine is turned on, but at a reduced speed, switch 84 remains open and switches 78 start to open as valves 74 are moved from seated position. Switch 83 may be open or closed, and it will be understood that this switch is provided merely to obtain manual control over the electrical system. So long as the switch 84 and switches 78 function properly, the switch 83 is unnecessary and may be omitted or left permanently closed. As the engine speed changes from low speed running to high speed running, and assuming the switch 83 now to be closed, switch 84 closes and all switches 78 stand open. Now in the event of damage and loss of fluid in any one radiator section, the switch 78 associated with that section closes to initiate shutting off of flow therethrough. The position of the parts then is that switches 83 and 84 are closed, six of the switches 78 are open and one thereof is closed.

What is claimed is:

1. A radiator, comprising a plurality of heat exchange tubes, means defining first and second header chambers into which the opposite ends of said tubes extend, a liquid inlet to said first header chamber, a liquid outlet from said second header chamber, first and second valves biased toward closed position and respectively located at said inlet and said outlet, said second valve having a flow responsive action and moving toward and from closed position as flow through said outlet respectively decreases and increases, means for latching said first valve in open position, and means for releasing said latching means in response to a travel of predetermined extent by said second valve toward closed position.

2. A radiator, comprising a plurality of heat exchange tubes, means defining first and second header chambers into which the opposite ends of said tubes extend, a liquid inlet to said first header chamber, a liquid outlet from said second header chamber, a first valve biased toward closed position located at said inlet, means for latching said valve in open position, a second valve movable in response to flow variations through said outlet, and means operable by said second valve for releasing said latching means in response to a decrease in flow below a predetermined value through said outlet.

3. A radiator according to claim 2, characterized by means responsive to flow through said inlet for rendering said releasing means ineffective when the rate of flow through said inlet is less than a predetermined value.

4. A radiator, comprising a plurality of sections, each of said sections including a number of heat exchange tubes and inlet and outlet header chambers communicating with the opposite ends of said tubes, inlet and outlet manifolds mounted on the radiator, individual openings in said inlet manifold respectively communicating with said inlet header chambers, individual openings in said outlet manifold respectively communicating with said outlet header chambers, valves associated with each of the openings in said manifolds, means for individually latching the valves in said inlet manifold in open position, the valves in said outlet manifold being flow responsive in action and moving toward closed position in response to a decrease in flow thereby, and means acting in response to a predetermined extent of motion of each valve in said outlet manifold toward closed position for unlatching the associated valve in said inlet manifold.

5. A radiator according to claim 4, characterized by valve seats in the openings in said inlet and outlet manifolds facing toward the interior of their respective manifolds, said valves moving toward closed position by motion toward said valve seats and being thus so arranged as to be urged toward closed position by the pressure of the fluid in said manifolds.

6. A radiator, comprising a plurality of heat exchange tubes, means defining first and second header chambers into which the opposite ends of said tubes extend, a liquid inlet to said first header chamber, a liquid outlet from said second header chamber, first and second valves biased toward closed position and respectively located at said inlet and said outlet, said first valve being arranged to close in the direction of fluid flow into said first header chamber and said second valve being arranged to close in a direction opposed to fluid flow out of said second header chamber and acting under the influence of such flow to move toward closed and open positions as the rate of flow out of said second header chamber decreases and increases, a latch for holding said first valve in open position, means including an electrically actuated solenoid for releasing said latch, and a switch operable by said second valve for energizing and deenergizing said solenoid.

7. A radiator, comprising inlet and outlet manifolds, a plurality of parallel flow paths between said manifolds, valves arranged at the opposite ends of each of said parallel flow paths, one of said valves being movable toward closed position in response to a decrease in the rate of flow through the circuit with which it is associated as may be caused by leakage from said circuit, and means responsive to closing motion of said one valve to initiate a closing movement of the corresponding valve at the opposite end of said flow path.

8. A radiator comprising a plurality of sections, each of said sections including a number of heat exchange tubes and inlet and outlet header chambers communicating with the opposite ends of said tubes, inlet and outlet manifolds mounted on the radiator, individual openings in said inlet manifold respectively communicating with said inlet header chambers, individual openings in said outlet manifold respectively communicating with said outlet header chambers, valve seats in the openings in said inlet and outlet manifolds facing toward the interior of said manifolds, valves movable within said manifolds toward engagement with said seats, springs urging said valves toward seated position, individual latches holding the valves in said inlet manifold off their associated seats, the valves in said outlet manifold being flow responsive in action to move away from and toward seated position in response to an increase and decrease in the rate of flow thereby into said outlet manifold, individual latch actuating means operable to release the valves in said inlet manifold, and means responsive to a predetermined extent of motion of each valve in said outlet manifold toward seated position for initiating operation of the latch actuating means associated with the corresponding valve in said inlet manifold.

9. A radiator according to claim 8, characterized in that said last named means comprises electric circuits each including a switch respectively operable by the valves in said outlet manifold, and each further including a solenoid coil in series with an associated switch and forming part of said latch actuating means.

10. A radiator according to claim 9, wherein said electric circuits are comprised in a master circuit as parallel branches thereof, said master circuit including a switch in advance of said parallel branches characterized by means movable in response to flow into said inlet manifold for respectively opening and closing said switch as the rate of flow into said inlet manifold decreases and increases from a predetermined value.

HARRY T. BOOTH.

REFERENCES CITED

The following references are of record in the file of this patent:

UNITED STATES PATENTS

| Number | Name | Date |
|---|---|---|
| 1,061,679 | Mallory | May 13, 1913 |
| 1,414,780 | Giesler | May 2, 1922 |
| 1,517,155 | Guyot | Nov. 25, 1924 |
| 2,012,351 | Riney | Aug. 27, 1935 |
| 2,041,726 | Pray | May 26, 1936 |
| 2,041,863 | Rhodes | May 26, 1936 |
| 2,244,373 | Powers | June 3, 1941 |

FOREIGN PATENTS

| Number | Country | Date |
|---|---|---|
| 105,351 | Great Britain | 1916 |
| 112,043 | Great Britain | Dec. 20, 1917 |
| 669,897 | France | Aug. 12, 1929 |
| 713,302 | France | Aug. 11, 1931 |